Oct. 30, 1956  C. S. BURTCHAELL  2,768,721
LUGGAGE HANDLE
Filed May 2, 1955
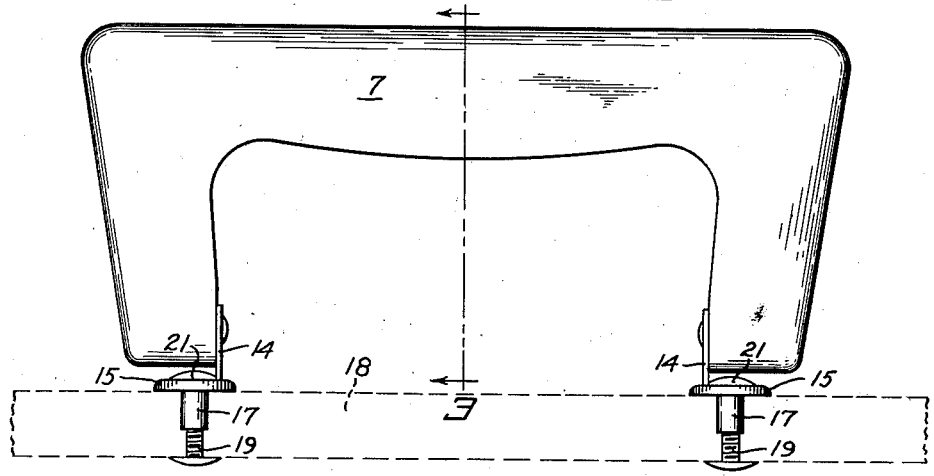
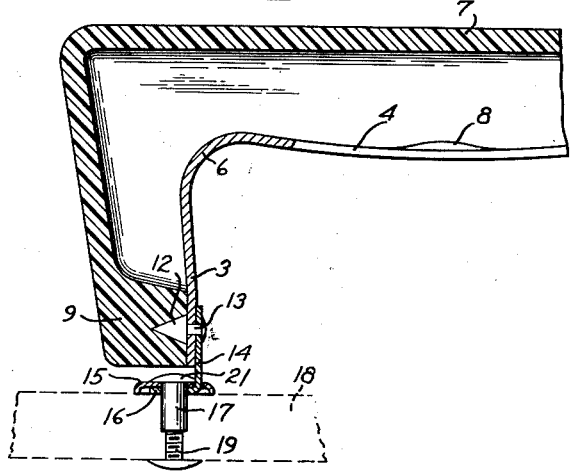
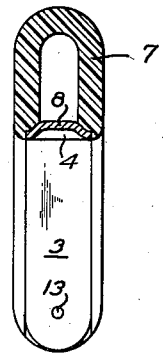
INVENTOR
CLARENCE S. BURTCHAELL
BY Charles S. Evans
his ATTORNEY

United States Patent Office 2,768,721
Patented Oct. 30, 1956

2,768,721
LUGGAGE HANDLE

Clarence S. Burtchaell, Ross, Calif.

Application May 2, 1955, Serial No. 505,289

2 Claims. (Cl. 190—57)

My invention relates to luggage handles comprised of a bail, a hand grip on the bail and fastening means for pivotally connecting the bail to the luggage.

One of the objects of my invention is the provision of improved means for securing the grip to the bail.

Another object is the provision of a luggage handle of appealing appearance, and made of simple parts quickly assembled and applied.

Other objects will be brought out in the following description of the invention. I do not limit myself to the showing made by said description and the drawings, since I may use variant forms of the invention within the scope of the appended claims.

Referring to the drawings:

Fig. 1 is a side elevation of my luggage handle as applied to the top of a piece of luggage, the latter being indicated by dotted lines.

Fig. 2 is a central, vertical sectional view through one end of my handle as applied to the top of a luggage case.

Fig. 3 is a vertical sectional view of the grip portion of my handle, taken in the plane 3—3 of Fig. 1.

My luggage handle is composed of two main elements; the grip shaped and conditioned for the hand; and the fastening devices for securing the grip to some convenient part of the luggage. A U-shaped bail in inverted position, connects the two elements and is a definite part of each one. The bail is made of a long narrow strip of spring metal with its ends 3 forming the sides of the U, joining the middle or top portion 4 of the U in easy curves 6 as shown. As a matter of ornamental values, the sides and middle portions of the bail are slightly curved.

A grip 7 is applied to the bail on the outside thereof; and is interlocked with the bail around the entire outer face and edges of the bail by seating flush within a complementary groove formed within the inner faces of the grip. At the center the extent of engaging surfaces to prevent lateral separation is increased by a bubble 8 in the bail extending upwardly into the grip as shown in Fig. 3.

The grip is preferably hollow to save weight, except at its lower ends, where it presents a small solid block 9. If desired the hollow grip may be formed from transparent material, and a liner sheet inserted in the hollow thereof.

The bail is further interlocked with the grip by a conical stud 12 fixed rigidly to the outer face of each end 3 and extending into the center of the block. The stud extends through the bail in the pin 13, which serves to pivotally connect the link 14 of the fastening means, mounting the handle on the luggage.

The bail with studs fixed therein and the grip are so proportioned that the sides of the bail may be drawn toward each other, the middle portion 4 and curved parts 6 seated in the groove and the ends 3 and studs 12 allowed to snap into place, so that bail and grip are securely interlocked.

Before the link 14 is placed over the pivot pin 13, it is assembled in the dome 15 by insertion through a close fitting aperture to seat its anchor leg 16 in the dome on the under side thereof. Both dome and anchor leg have central holes which align when they are put together; and a hollow screw 17 fits these holes, and is of a length to extend downwardly in the side 18 of the luggage and to be engaged by a screw 19.

The head 21 of the hollow screw is smooth, but the screw is prevented from turning by a flattened part of the head which lies against the link.

After assembly of dome and hollow screw on the anchor leg, the link is placed on the pivot pin 13, which is then headed over for a permanent connection.

Until the handle is applied to the piece of luggage, the dome and hollow screw are retained loosely on the anchor leg. With application of the handle to the luggage, the screw 19 pulls the dome and anchor leg down into a tight and rigid engagement with the side 18.

I claim:

1. A luggage handle comprising a resilient metal strip forming an inverted U-shaped bail, means fastening the bail to the luggage and including a pivot pin having an outwardly extending conical lug, a hollow saddle open on its inner faces and having a seat on its inner faces in which the bail rests to close the opening into the saddle, and a recess in each end of the saddle in which said conical lug engages to retain the saddle on the bail.

2. A luggage handle comprising a resilient metal strip forming an inverted U-shaped bail, a handle arranged on the bail, an L-shaped link having one leg thereof pivotally connected to the bail and the other leg having an aperture therein, a dome having a central aperture and a second aperture radially spaced from said central aperture, said dome overlying said other leg with the central dome aperture and leg aperture in axial alignment when said first mentioned leg of the link projects through said radially spaced second aperture, and a screw disposed in said central dome aperture to secure the dome to the luggage.

References Cited in the file of this patent

UNITED STATES PATENTS 2,678,707     Finkelstein             May 18, 1954